(12) United States Patent
Kamachi et al.

(10) Patent No.: US 11,104,526 B2
(45) Date of Patent: Aug. 31, 2021

(54) MOVING DEVICE

(71) Applicant: HONDA MOTOR CO., LTD., Tokyo (JP)

(72) Inventors: Hideari Kamachi, Tochigi-ken (JP); Gentoku Fujii, Tochigi-ken (JP); Nobuhiro Kozasa, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/297,794

(22) Filed: Mar. 11, 2019

(65) Prior Publication Data
US 2019/0283984 A1 Sep. 19, 2019

(30) Foreign Application Priority Data
Mar. 14, 2018 (JP) .............................. JP2018-046861

(51) Int. Cl.
*B65G 63/00* (2006.01)
*B65G 1/04* (2006.01)

(52) U.S. Cl.
CPC ......... *B65G 63/004* (2013.01); *B65G 1/0457* (2013.01)

(58) Field of Classification Search
CPC ....... B65G 1/0457; B65G 63/004; B66F 9/18; B66F 9/185; B66F 9/186; B66C 1/101; B66C 1/12; B66C 1/223; B66C 1/125; B66D 1/26; B66D 1/36; B66D 1/40; B66D 1/60
See application file for complete search history.

(56) References Cited

U.S. PATENT DOCUMENTS

| | | | | |
|---|---|---|---|---|
| 3,536,351 A | * | 10/1970 | Zweifel | B66C 1/102 294/81.1 |
| 3,671,069 A | * | 6/1972 | Martin | B66C 1/101 294/81.1 |
| 5,440,476 A | * | 8/1995 | Lefkowitz | G05B 19/251 212/76 |
| 6,345,724 B1 | * | 2/2002 | Masumoto | B66D 1/22 212/173 |
| 6,631,816 B1 | * | 10/2003 | Miyazawa | B66C 11/18 212/271 |
| 7,040,496 B2 | * | 5/2006 | Hakala | B66C 13/06 212/274 |
| 7,559,429 B1 | * | 7/2009 | Ichimura | B66C 1/663 212/274 |

(Continued)

FOREIGN PATENT DOCUMENTS

| | | |
|---|---|---|
| JP | 07-267575 | 10/1995 |
| JP | 08-299600 | 11/1996 |

*Primary Examiner* — Kaitlin S Joerger
(74) *Attorney, Agent, or Firm* — Amin, Turocy & Watson, LLP

(57) ABSTRACT

A moving device is provided with a first moving body and a second moving body. First cord-shaped bodies are fed out from first feed-out length changing units provided on first feed-out units. The first cord-shaped bodies are connected to the first moving body. Second cord-shaped bodies are fed out from second feed-out length changing units provided on second feed-out units. The second cord-shaped bodies are connected to the second moving body. Further, the first moving body and the second moving body are connected to each other through a third cord-shaped body.

5 Claims, 14 Drawing Sheets

(56) References Cited

U.S. PATENT DOCUMENTS

| | | | | |
|---|---|---|---|---|
| 7,753,642 B2* | 7/2010 | Bosscher | ............... | B25J 9/0078 414/735 |
| 7,918,354 B2* | 4/2011 | Shan | ............... | B66C 11/12 212/323 |
| 9,103,471 B2* | 8/2015 | Vehmeijer | ............... | B66D 1/26 |
| 9,868,596 B2* | 1/2018 | Worsley | ............... | B65G 61/00 |
| 10,099,368 B2* | 10/2018 | DelSpina | ............... | A61B 90/50 |
| 10,138,098 B2* | 11/2018 | Sorensen | ............... | B66D 1/26 |
| 10,843,882 B2* | 11/2020 | Worsley | ............... | B65G 61/00 |
| 2008/0054836 A1* | 3/2008 | Rodnunsky | ............... | F16M 11/043 318/649 |
| 2011/0127477 A1* | 6/2011 | Kokolis | ............... | B66D 1/26 254/285 |
| 2012/0298937 A1* | 11/2012 | Fisher | ............... | B66C 21/00 254/283 |
| 2014/0008592 A1* | 1/2014 | Yang | ............... | B66C 13/08 254/278 |
| 2019/0152051 A1* | 5/2019 | Bramberger | ............... | E04B 1/3505 |
| 2019/0283984 A1* | 9/2019 | Kamachi | ............... | B65G 1/0457 |

* cited by examiner

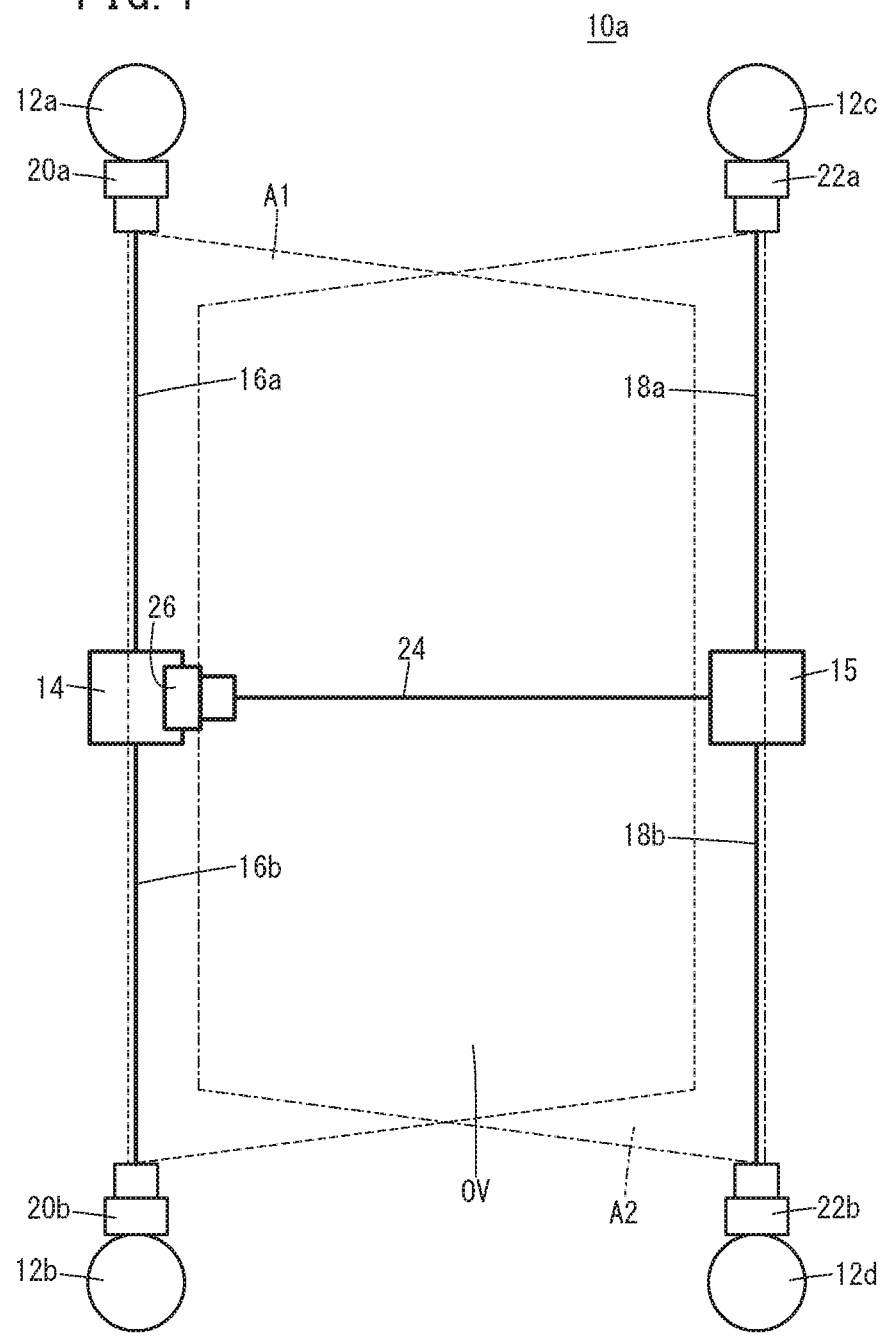

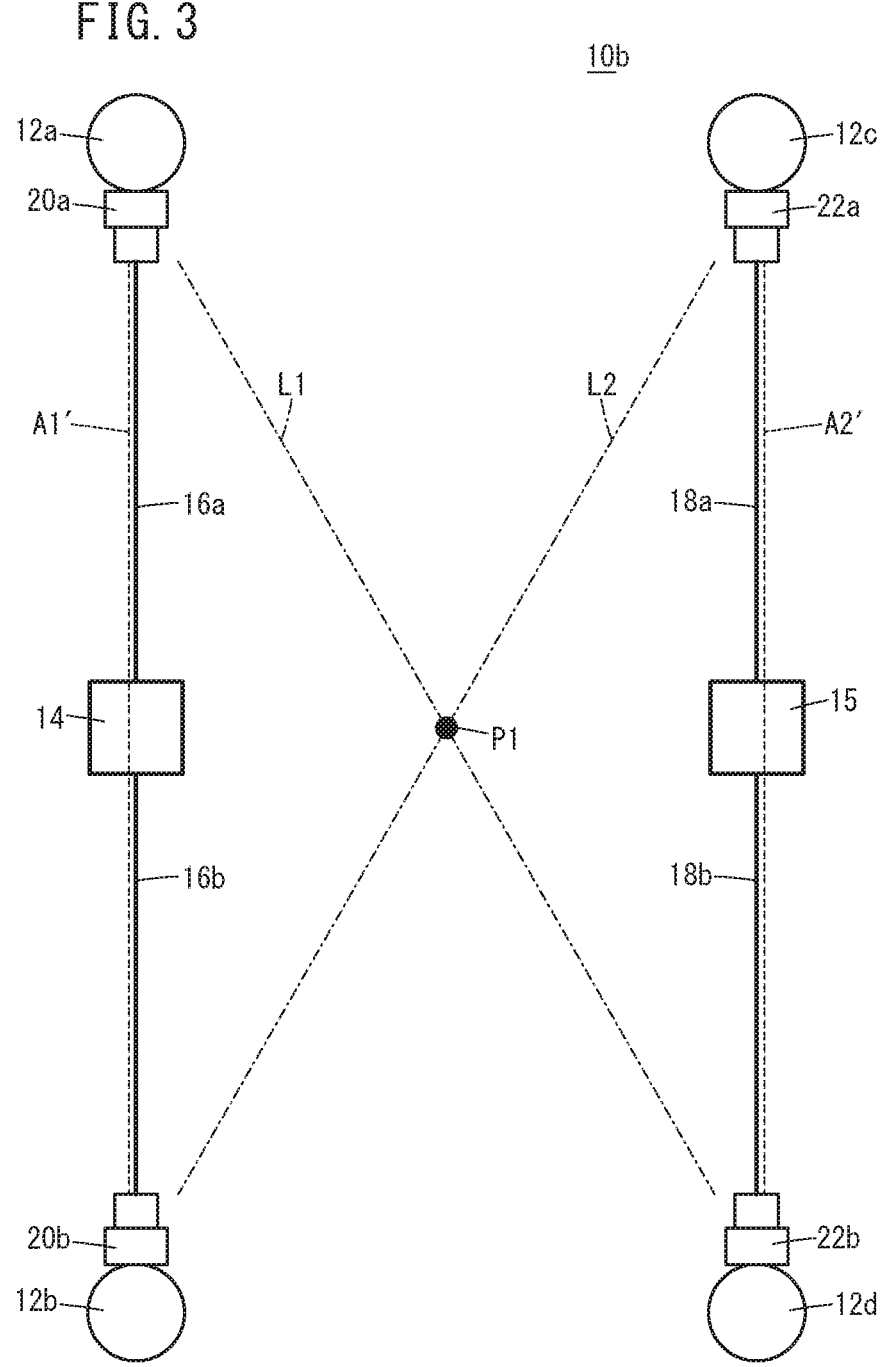

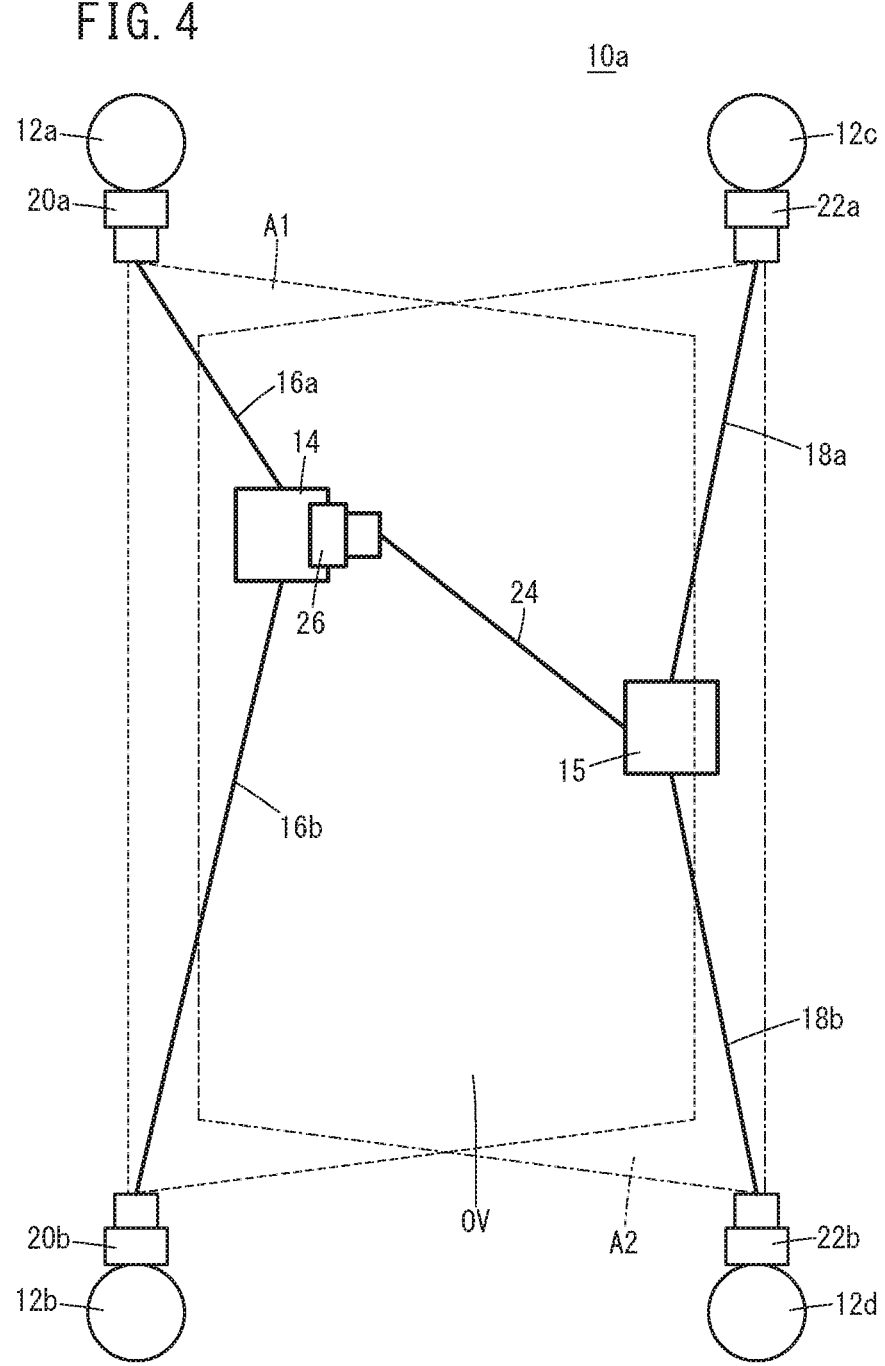

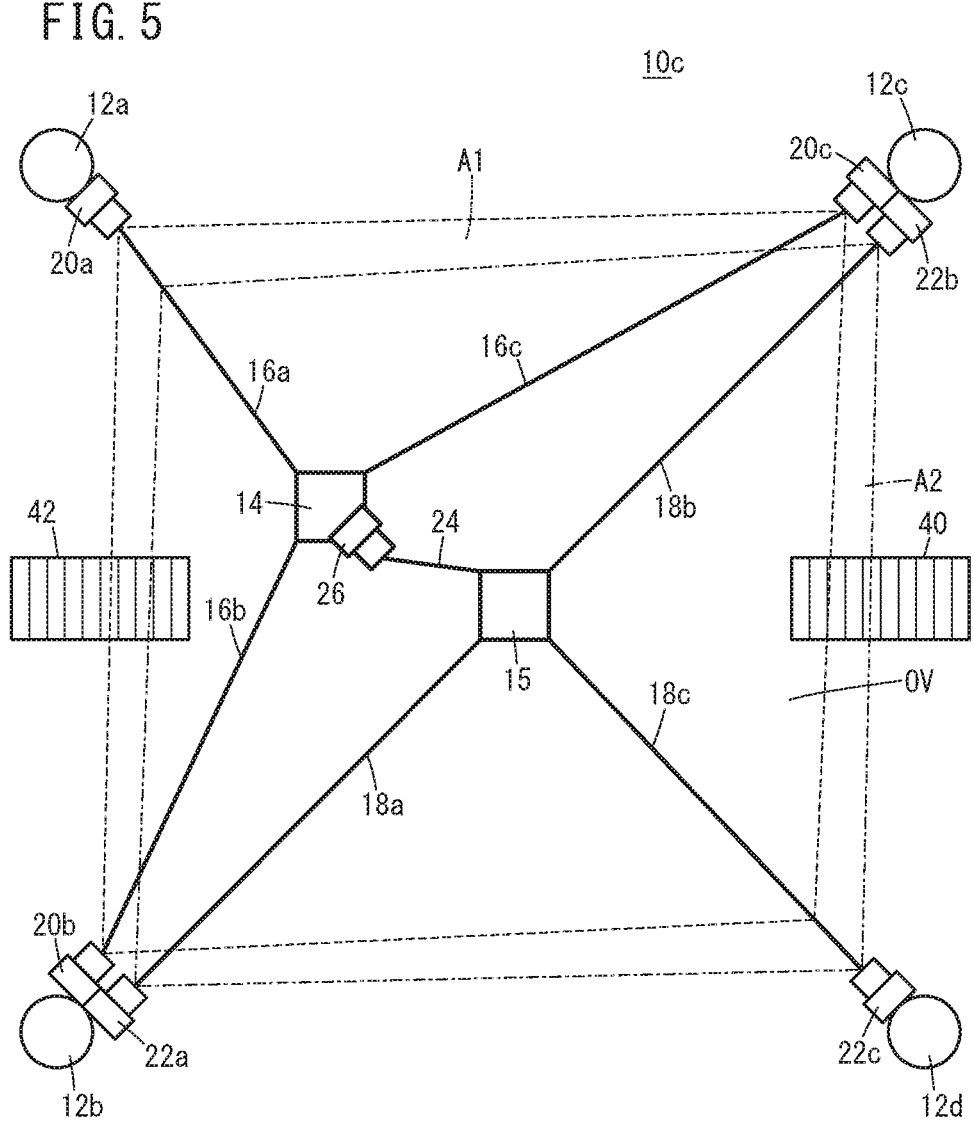

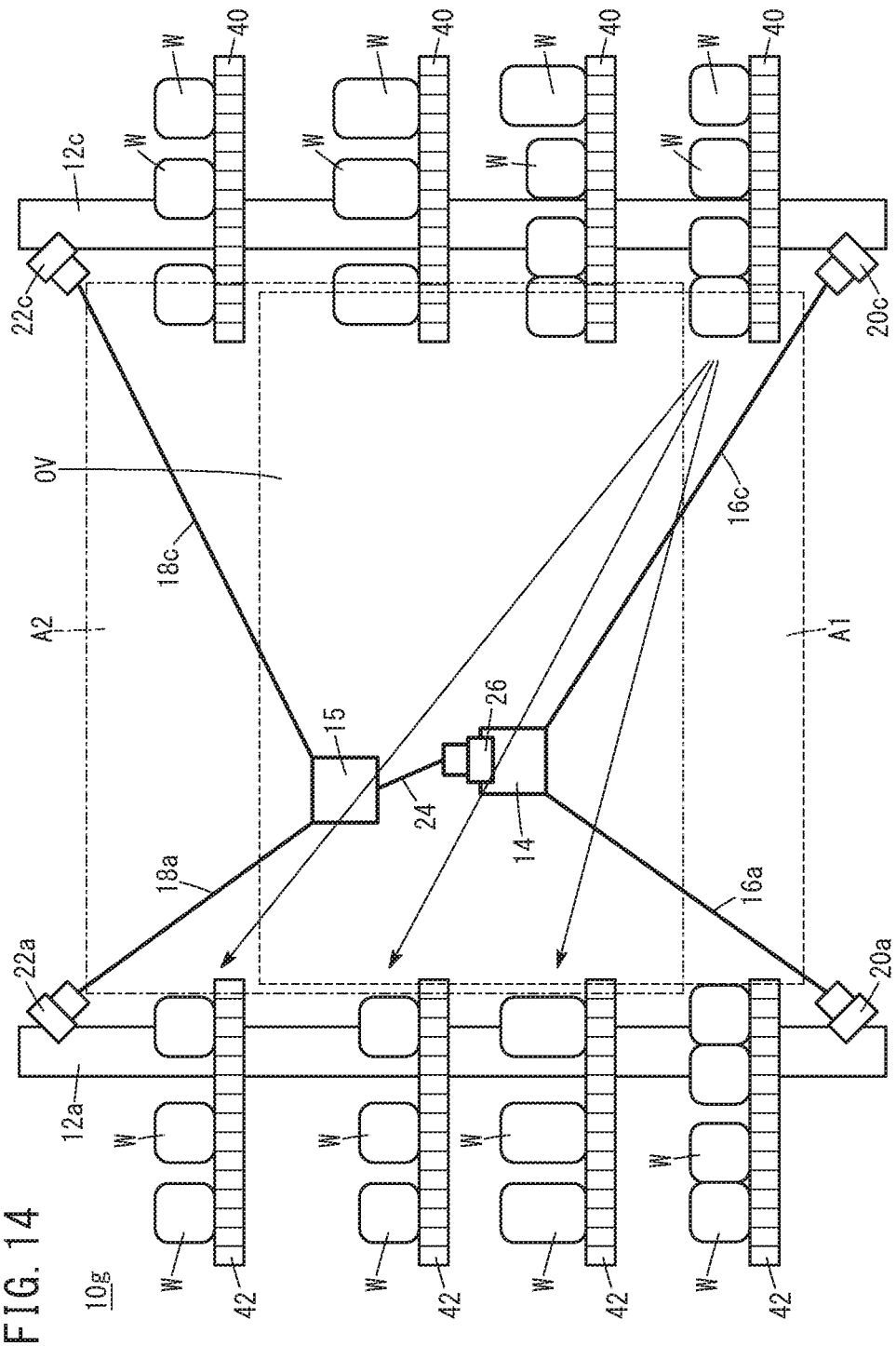

MOVING DEVICE

CROSS-REFERENCE TO RELATED APPLICATION

This application is based upon and claims the benefit of priority from Japanese Patent Application No. 2018-046861 filed on Mar. 14, 2018, the contents of which are incorporated herein by reference.

BACKGROUND OF THE INVENTION

Field of the Invention

The present invention relates to a moving device and particularly to a moving device suitable for transferring an object.

Description of the Related Art

There has been known a suspension moving device which suspends a moving body by cord-shaped bodies such as wires or the like and is configured to move the moving body along the wires (for example, refer to Japanese Laid-Open Patent Publication No. 07-267575 and Japanese Laid-Open Patent Publication No. 08-299600). The moving body is capable of holding an object, so that the object is transferred through the movement of the moving body. That is, it is possible to utilize the suspension moving device as a transfer device.

The moving devices disclosed in Japanese Laid-Open Patent Publication No. 07-267575 and Japanese Laid-Open Patent Publication No. 08-299600 each have four support posts and one moving body. The moving body and the support posts are connected to the support posts through cord-shaped bodies. By suitably adjusting an unwinding or feed-out amount of each cord-shaped body, it is possible to move the moving body and the object held on the moving body to a desired position.

SUMMARY OF THE INVENTION

The moving body in the moving device described in each of the aforementioned two patent documents is movable only within an area defined by the support posts that are connected to each other by wires. That is, it is impossible to move the moving body beyond a predetermined area. In other words, the area within which the object can be transferred is limited.

A primary object of the present invention is to provide a moving device capable of moving a moving body to any desired position.

According to an aspect of the present invention, there is provided a moving device which includes:
a first moving body;
at least two first feed-out units;
at least two first cord-shaped bodies stretched between the first moving body and the first feed-out units;
first feed-out length changing units configured to change feed-out lengths of the first cord-shaped bodies individually;
a second moving body
at least two second feed-out units;
at least two second cord-shaped bodies stretched between the second moving body and the second feed-out units; and
second feed-out length changing units configured to change feed-out lengths of the second cord-shaped bodies individually, wherein the moving device further includes a third cord-shaped body connecting the first moving body and the second moving body.

With the third cord-shaped body tensioned, the first moving body and the second moving body are mutually restrained through the third cord-shaped body. Thus, when the first moving body is moved, the second moving body is moved to follow the movement of the first moving body. Therefore, by suitably adjusting the feed-out lengths of the first cord-shaped bodies or the second cord-shaped bodies, it is possible to cause the second moving body to come close relatively to the first moving body. This enlarges the moving ranges of the first moving body and the second moving body in comparison with a configuration that the third cord-shaped body is not provided.

That is, it becomes easy to move the first moving body and the second moving body to any desired positions. Accordingly, in the case where the moving device is employed as a transfer device, the area within which an object can be transferred can be expanded.

It is desirable that the first moving body or the second moving body be provided with a third feed-out length changing unit configured to change the feed-out length of the third cord-shaped body. With this configuration, it is possible to arbitrarily change a distance between the first moving body and the second moving body. Thus, the area within which the first moving body and the second moving body can be moved can be further expanded.

Desirably, in a state that the third cord-shaped body is tensioned, a moving range of the first moving body and a moving range of the second moving body partially overlap with each other. In this case, for example, an object held by the first moving body is released and then can be gripped again by the second moving body. That is, it is possible to hand over the object between the first moving body and the second moving body. Accordingly, it is possible to hold the object within the area in which the first moving body only is movable, and then to release the object within the area in which the second moving body only is movable.

The number of the first cord-shaped bodies may be three or more, and the number of the second cord-shaped bodies may be three or more. In this case, the movable areas of the first moving body and the second moving body can be further expanded.

It is preferable that the first moving body and the second moving body be each provided with a gripping mechanism. The gripping mechanism makes it possible to hold the object on the first moving body and the second moving body. Therefore, it is possible to transfer the object through the movements of the first moving body and the second moving body.

According to the present invention, the third cord-shaped body is connected between the first moving body configured to be moved by changing the feed-out lengths of the first cord-shaped bodies and the second moving body configured to be moved by changing the feed-out lengths of the second cord-shaped bodies. Thus, since the first moving body and the second moving body are mutually restrained through the third cord-shaped body, the movement of the first moving body causes movement of the second moving body accordingly. By suitably adjusting the feed-out lengths of the first cord-shaped bodies or the second cord-shaped bodies, it is possible to move the second moving body so as to come close relatively to the first moving body. For this reason, the moving ranges of the first moving body and the second moving body become larger than in a configuration which is not provided with the third cord-shaped body. Accordingly, it becomes easy to move the first moving body and the second moving body respectively to any desired positions.

The above and other objects, features, and advantages of the present invention will become more apparent from the following description when taken in conjunction with the accompanying drawings, in which preferred embodiments of the present invention are shown by way of illustrative examples.

BRIEF DESCRIPTION OF THE DRAWINGS

FIG. 1 is a schematic plan view of a moving device according to a first embodiment of the present invention;

FIG. 3 is a schematic plan view of a moving device which is not provided with a third wire (third cord-shaped body) and a third motor (third feed-out length changing mechanism) in the moving device shown in FIG. 1;

FIG. 4 is a schematic plan view showing a state in which the first moving body and the second moving body have been moved from the state of FIG. 1;

FIG. 5 is a schematic plan view of a moving device according to a second embodiment of the present invention;

FIG. 14 is a schematic side view of the moving device shown in FIG. 13.

DESCRIPTION OF THE PREFERRED EMBODIMENTS

Hereinafter, with reference to the accompanying drawings, a moving device according to the present invention will be described in detail based on preferred embodiments.

FIG. 1 is a schematic plan view of a moving device 10*a* according to a first embodiment of the present invention. This moving device 10*a* has a first support post 12*a* to a fourth support post 12*d*, a first moving body 14 and a second moving body 15. The first moving body 14 is connected to the first support post 12*a* and the second support post 12*b* through two first wires 16*a*, 16*b* (first cord-shaped bodies), while the second moving body 15 is connected to a third support post 12*c* and the fourth support post 12*d* through two second wires 18*a*, 18*b* (second cord-shaped bodies).

The two first wires 16*a*, 16*b* are fed out (unwound) or wound (taken up) under the operation of first motors 20*a*, 20*b* (first feed-out length changing units) respectively provided on the first support post 12*a* and the second support post 12*b*. On the other hand, the third support post 12*c* and the fourth support post 12*d* are respectively provided with second motors 22*a*, 22*b* (second feed-out length changing units), and the two second wires 18*a*, 18*b* are fed out (unwound) or wound under the operation of the second motors 22*a*, 22*b*. Like this, the first support post 12*a* and the second support post 12*b* are first feed-out units for stretching the first wires 16*a*, 16*b*, while the third support post 12*c* and the fourth support post 12*d* are second feed-out units for stretching the second wires 18*a*, 18*b*.

The first moving body 14 and the second moving body 15 are connected to each other by a third wire 24 (third cord-shaped body). More specifically, the first moving body 14 is provided with a third motor 26 (third feed-out length changing unit), and the third wire 24 is fed out (unwound) or wound under the operation of the third motor 26. That is, the feed-out length of the third wire 24 is changed. An end of the third wire 24 is hooked on the second moving body 15. Thus, when the third wire 24 is wound or taken up, the second moving body 15 is drawn toward the first moving body 14.

Figure 2A:
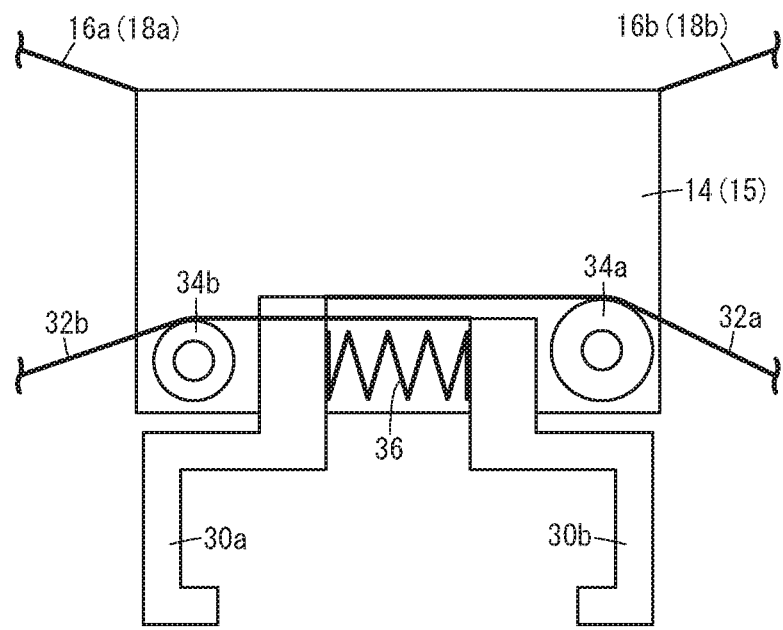
FIG. 2A is a schematic cross-sectional view of each of first and second moving bodies of the moving device shown in FIG. 1.

As shown in FIG. 2A, each of the first moving body 14 and the second moving body 15 has, at its lower portion, two openable and closable clamping claws 30*a*, 30*b* constituting a gripping mechanism. The first moving body 14 and the second moving body 15 are each able to hold a given object W by displacing the clamping claws 30*a*, 30*b* in a direction to come closer to each other (i.e., by closing the clamping claws 30*a*, 30*b*).

More specifically, a first opening and closing wire 32*a* is tensionally connected to the clamping claw 30*a*, while a second opening and closing wire 32*b* is tensionally connected to the clamping claw 30*b*. The first opening and closing wire 32*a* and the second opening and closing wire 32*b* are fed out (unwound) from or taken up (wound) around feed-out motors (not shown) provided respectively on the first support post 12*a* and the second support post 12*b*. Further, the first opening and closing wire 32*a* and the second opening and closing wire 32*b* are wound around tension adjusting rollers 34*a*, 34*b* inside the first moving body 14 and the second moving body 15, respectively. Further, a coil spring 36 is interposed between the clamping claw 30*a* and the clamping claw 30*b* in order to elastically urge these clamping claws 30*a*, 30*b* in a direction away from each other.

Figure 2B:
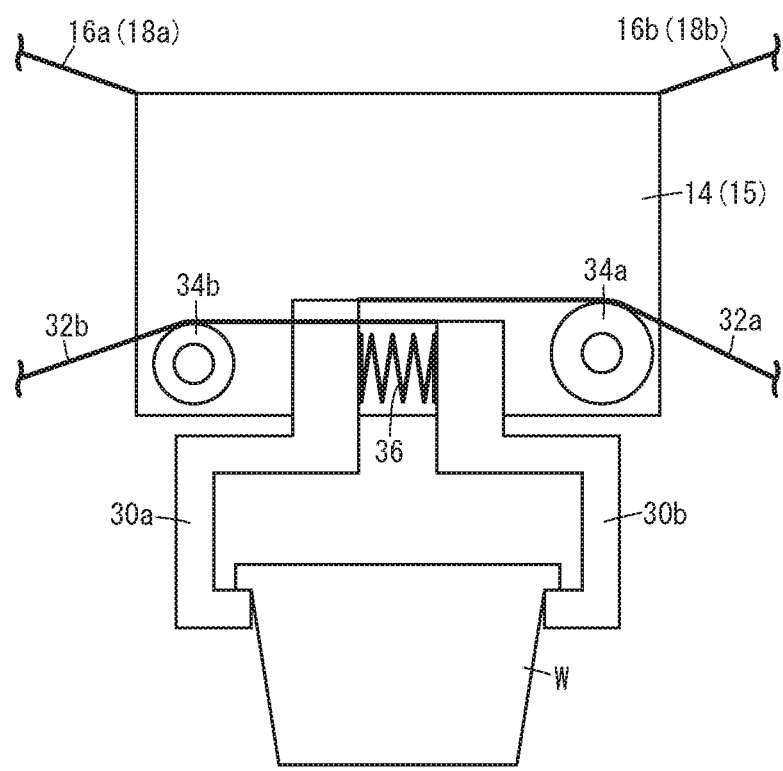
FIG. 2B is a schematic cross-sectional view of each of the first and second moving bodies of the moving device shown in FIG. 1.

With this configuration, when rotation of the tension adjusting rollers 34*a*, 34*b* in the winding direction increases the tension of the first opening and closing wire 32*a* and the second opening and closing wire 32*b*, the first opening and closing wire 32*a* pulls the clamping claw 30*a* toward the clamping claw 30*b* and the second opening and closing wire 32*b* pulls the clamping claw 30*b* toward the clamping claw 30*a* against the elastic urging force of the coil spring 36. Of course, the coli spring 36 is compressed. As a result, the clamping claws 30*a*, 30*b* come close to each other, and the clamping claws 30*a*, 30*b* are closed. Thus, the object W is grasped as shown in FIG. 2B by the clamping claws 30*a*, 30*b* closed.

In order to release the object W, the tension adjusting rollers 34*a*, 34*b* are rotated in a release direction opposite to the above. Thus, when the tension of the first opening and closing wire 32a and the second opening and closing wire 32b becomes lower than the elastic urging force of the coil spring 36, the coil spring 36 stretches to elastically urge the clamping claws 30a, 30b. As a result, the clamping claws 30a, 30b are displaced in directions away from each other and then opened, whereby the object W is released.

Incidentally, it is possible to use the first opening and closing wire 32a and the second opening and closing wire 32b also as the cord-shaped bodies. Specifically, the tension adjusting rollers 34a, 34b are operated with the clamping claws 30a, 30b held in the closed state. By so doing, it is possible to change the positions and the postures of the first moving body 14 and the second moving body 15.

For the purpose of comparison, FIG. 3 shows a moving device 10b in which the third wire 24 is not provided between the first moving body 14 and the second moving body 15. In this moving device 10b, when the first motor 20a provided on the first support post 12a feeds out the first wire 16a wound therearound while the first motor 20b provided on the second support post 12b winds the first wire 16b, the first moving body 14 is moved toward the second support post 12b. Conversely, for moving the first moving body 14 toward the first support post 12a, the first wire 16a is wound by the first motor 20a while the first wire 16b is fed out from the first motor 20b.

Likewise, when the second motor 22a provided on the third support post 12c feeds out the second wire 18a wound therearound while the second motor 22b provided on the fourth support post 12d winds the second wire 18b, the second moving body 15 is also moved toward the fourth support post 12d. Contrary to this, when the second motor 22a winds the second wire 18a therearound while the second motor 22b feeds out the second wire 18b wound therearound, the second moving body 15 is moved toward the third support post 12c.

Like this, in this moving device 10b, the moving range of the first moving body 14 is limited to a linear area A1' between the first support post 12a and the second support post 12b, and the moving range of the second moving body 15 is limited to a linear area A2' between the third support post 12c and the fourth support post 12d. Therefore, it is impossible to move the first moving body 14 or the second moving body 15 to an intersection point P1 of a first imaginary line L1 connecting the first support post 12a to the fourth support post 12d and a second imaginary line L2 connecting the second support post 12b to the third support post 12c.

On the other hand, in the moving device 10a according to the first embodiment, the third wire 24 is connected between the first moving body 14 and the second moving body 15 (refer to FIG. 1). In a state that the third wire 24 is loosened, the movement of the first moving body 14 only causes the third wire 24 to be fed out and extended, and thus, movement of the second moving body 15 is not restrained by the first moving body. Therefore, it is possible for the first moving body 14 to move linearly only between the first support post 12a and the second support post 12b. For the same reason, it is possible for the second moving body 15 to move linearly only between the third support post 12c and the fourth support post 12d.

Meanwhile, in the state that the third wire 24 is tensioned, the movement of the first moving body 14 causes the second moving body 15 to be moved by being pulled by the third wire 24. That is, movement of the second moving body 15 is restrained by the first moving body 14. Thus, when the first moving body 14 moves, the second moving body 15 accordingly moves so as to come close to the first moving body 14. Similarly, when the second moving body 15 moves, the first moving body 14 accordingly moves so as to come close to the second moving body 15.

Accordingly, it is possible to move the first moving body 14 and the second moving body 15 to, for example, respective positions shown in FIG. 4. FIGS. 1 and 4 each also illustrate an area (first moving range) A1 within which the first moving body 14 can be moved when the third wire 24 is in a tension state and another area (second moving range) A2 within which the second moving body 15 can be moved when the third wire 24 is in a tension state. Therefore, it is possible to move the object W gripped by the first moving body 14 within the first moving range A1 and to move another object W gripped by the second moving body 15 within the second moving range A2.

As understood from FIG. 4, in the state that the third wire 24 is tensioned, the first moving range A1 and the second moving range A2 partially overlap with each other. Thus, there is formed an overlapping area OV. Therefore, for example, it is possible to move the object W disposed within the first moving range A1 to the second moving range A2. Specifically, first, the object W within the first moving range A1 (within an area other than the overlapping area OV) is held by the clamping claws 30a, 30b of the first moving body 14, and thereafter the first moving body 14 is moved to the overlapping area OV and the object W is released from the clamping claws 30a, 30b. Further, the object W is gripped by the clamping claws 30a, 30b of the second moving body 15 and then the second moving body 15 is moved from the overlapping area OV to the second moving range A2. Of course, it is also possible to transfer the object W within the overlapping area OV. After the second moving body 15 (or the first moving body 14) reaches a final destination, the object W is released from the clamping claws 30a, 30b.

Like this, the third wire 24 is connected between the first moving body 14 and the second moving body 15 and is held in a tension state. With this configuration, it is possible not only to move the object W within the linear area between the first support post 12a and the second support post 12b or within the linear area between the third support post 12c and the fourth support post 12d (refer to FIG. 3) but also to move the first moving body 14 or the second moving body 15 over the entire area (refer to FIG. 4) surrounded by the first support post 12a to the fourth support post 12d, and hence to transfer the object W within the entire area.

As described above, with the third wire 24 loosened, movement of the first moving body 14 is not restrained by the second moving body 15. Accordingly, it is also possible to move the first moving body 14 and the second moving body 15 separately, in other words, to move the objects W separately by the first moving body 14 and the second moving body 15.

Next, a moving device 10c according to a second embodiment of the present invention will be described with reference to FIG. 5. Incidentally, components identical to those shown in FIGS. 1 to 4 will be given the same reference numerals, and the detailed descriptions of such components will be omitted.

In the moving device 10c, the first moving body 14 is connected to the first support post 12a, the second support post 12b and the third support post 12c through three first wires 16a to 16c (first cord-shaped bodies), while the second moving body 15 is connected to the second support post 12b, the third support post 12c and the fourth support post 12d through three second wires 18a to 18c (second cord-shaped bodies).

The three first wires 16a to 16c are fed out (unwound) and taken up (wound) under the operation of first motors 20a to 20c which are respectively provided on the first support post 12a, the second support post 12b and the third support post 12c. On the other and, the second support post 12b, the third support post 12c and the fourth support post 12d are respectively provided with second motors 22a to 22c, and the three second wires 18a to 18c are fed out or wound under the operation of the respective second motors 22a to 22c. Like this, the first support post 12a, the second support post 12b and the third support post 12c are first feed-out units for feeding out the first wires 16a to 16c, while the second support post 12b, the third support post 12c and the fourth support post 12d are second feed-out units for feeding out the second wires 18a to 18c. That is, the second support post 12b and the third support post 12c each serve as both of the first feed-out unit and the second fee-out unit.

The first moving body 14 and the second moving body 15 are mutually connected by the third wire 24 (third cord-shaped body). In this case, the first moving body 14 is provided with a third motor 26, and the third wire 24 is wound around the third motor 26. An end of the third wire 24 is hooked on the second moving body 15. Therefore, when the third wire 24 is wound or taken up, the second moving body 15 is drawn toward the first moving body 14.

Further, the moving device 10c is additionally provided with a loading roller conveyor 40 and an unloading roller conveyor 42. One end of the loading roller conveyor 40 that is adjacent to the second moving body 15 and one end of the unloading roller conveyor 42 that is adjacent to the first moving body 14 are located within the overlapping area OV.

Figure 6:
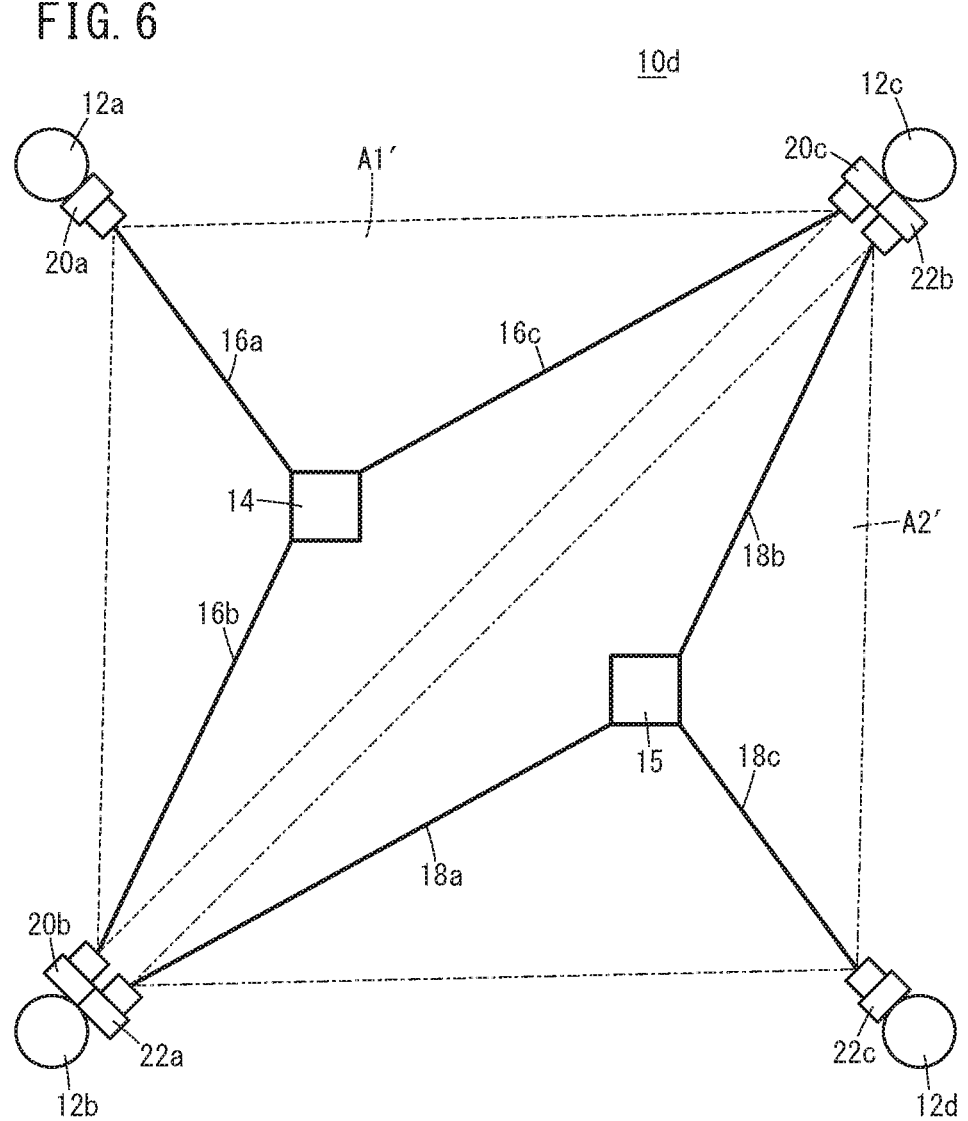
FIG. 6 is a schematic plan view of a moving device which is not provided with a third wire and a third motor in the moving device shown in FIG. 5.

For the purpose of comparison, there is shown in FIG. 6 a moving device 10d which is not provided with the third wire 24 between the first moving body 14 and the second moving body 15. In this moving device 10d, the first moving body 14 is movable within a first moving range A1' when the first wires 16a to 16c are suitably fed out (unwound) and taken up (wound). Further, the second moving body 15 is movable within a second moving range A2' when the second wires 18a to 18c are suitably fed out and taken up. As understood from FIG. 6, the first moving range A1' and the second moving range A2' do not overlap with each other. Accordingly, the first moving body 14 cannot enter the second moving range A2' and the second moving body 15 cannot enter the first moving range A1'. That is, the object W held on the first moving body 14 cannot be transferred into the second moving range A2'.

On the other hand, in the moving device 10c according to the second embodiment, the third wire 24 is connected between the first moving body 14 and the second moving body 15 (refer to FIG. 5). With this third wire 24 tensioned, the movement of the first moving body 14 causes the third wire 24 to pull and move the second moving body 15. This is because movement of the second moving body 15 is restrained by the first moving body 14. When the second moving body 15 is moved, the first moving body 14 is likewise pulled and moved by the third wire 24. Therefore, when one of the first moving body 14 and the second moving body 15 is moved, the first and second moving bodies approach each other.

Accordingly, it is possible to move the first moving body 14 and the second moving body 15, for example, to respective positions shown in FIG. 5. FIG. 5 also illustrates both of an area (first moving range) A1 within which the first moving body 14 can be moved when the third wire 24 is in the tension state and an area (second moving range) A2 within which the second moving body 15 can be moved when the third wire 24 is in the tension state. As in the first embodiment, it is possible to move the object W gripped by the first moving body 14 within the first moving range A1 and to move the object W gripped by the second moving body 15 within the second moving range A2.

With the third wire 24 held in the tension state, the first moving range A1 and the second moving range A2 partially overlap with each other, so that the overlapping area OV is defined. Therefore, for example, the object W disposed within the second moving range A2 can be moved into the first moving range A1. Specifically, the clamping claws 30a, 30b of the second moving body 15 first hold the object W within the second moving range A2 (within an area other than the overlapping area OV), and thereafter the second moving body 15 is moved to the overlapping area OV and releases the object W from the clamping claws 30a, 30b. Subsequently, the first moving body 14 holds the object W by the clamping claws 30a, 30b thereof and then is moved from the overlapping area OV to the first moving range A1. Of course, it is also possible to transfer the object W within the overlapping area OV. When the first moving body 14 (or the second moving body 15) reaches a final destination, the object W is released from the clamping claws 30a, 30b.

Like this, by connecting the third wire 24 between the first moving body 14 and the second moving body 15 and by holding the third wire 24 in the tension state, it is possible to hand over the object W between the first moving body 14 and the second moving body 15. That is, the area within which the object W can be transferred is enlarged.

FIGS. 7 to 10 illustrate situations where the objects W are transferred in the moving device 10c as flow of transferring the objects. As understood from FIG. 7, in this case, a plurality of objects W are disposed within an area surrounded by the first support post 12a to the fourth support post 12d.

Figure 7:
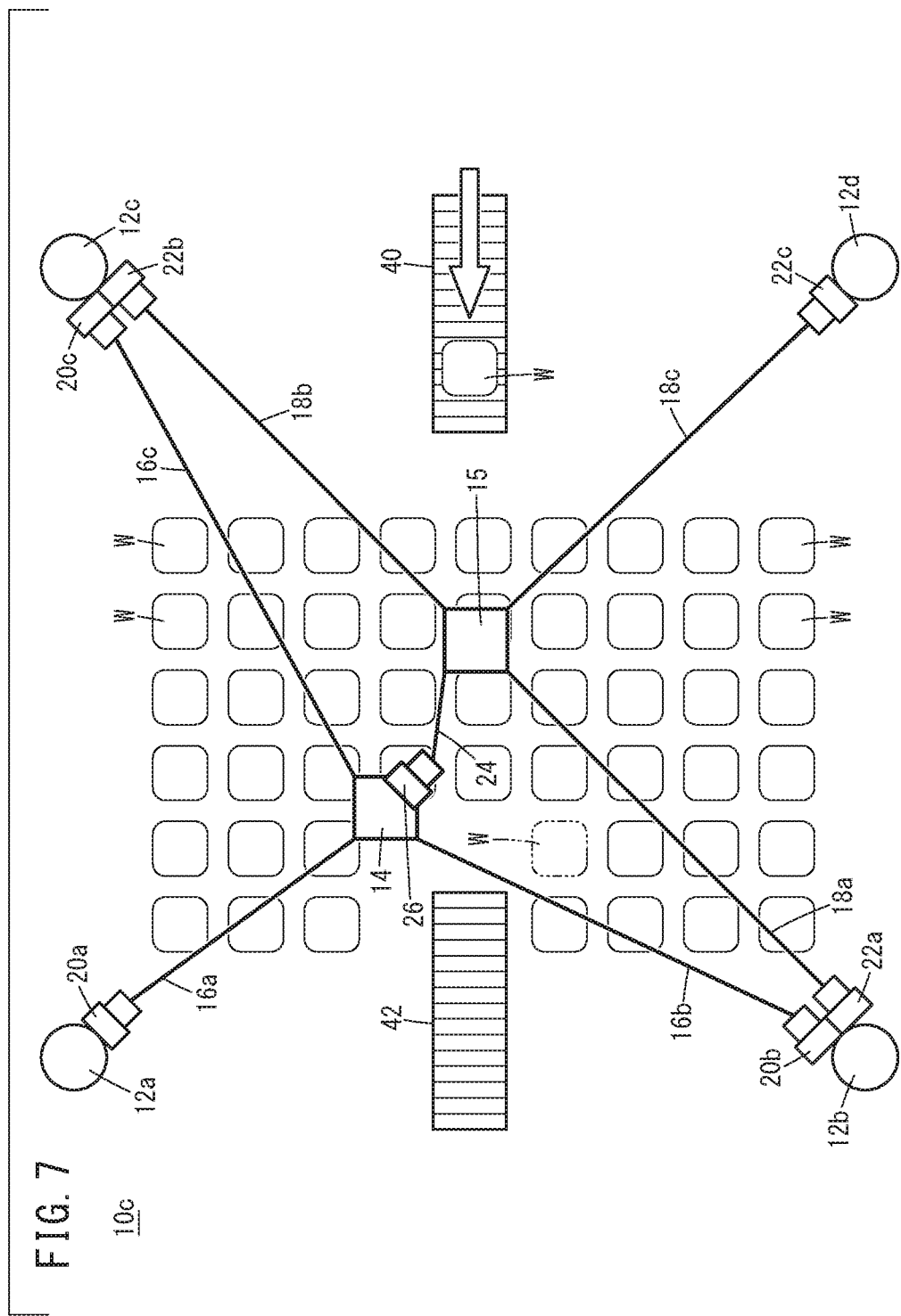
FIG. 7 is a schematic plan view showing a state that a vacancy is formed after the first moving body holds one of plural objects.

First, in FIG. 7, the first moving body 14 holds one of the objects W within the moving device 10c. The object W held is one which was originally disposed at a position indicated by the phantom line. On the other hand, a new object W is supplied from the loading roller conveyor 40.

Figure 8:
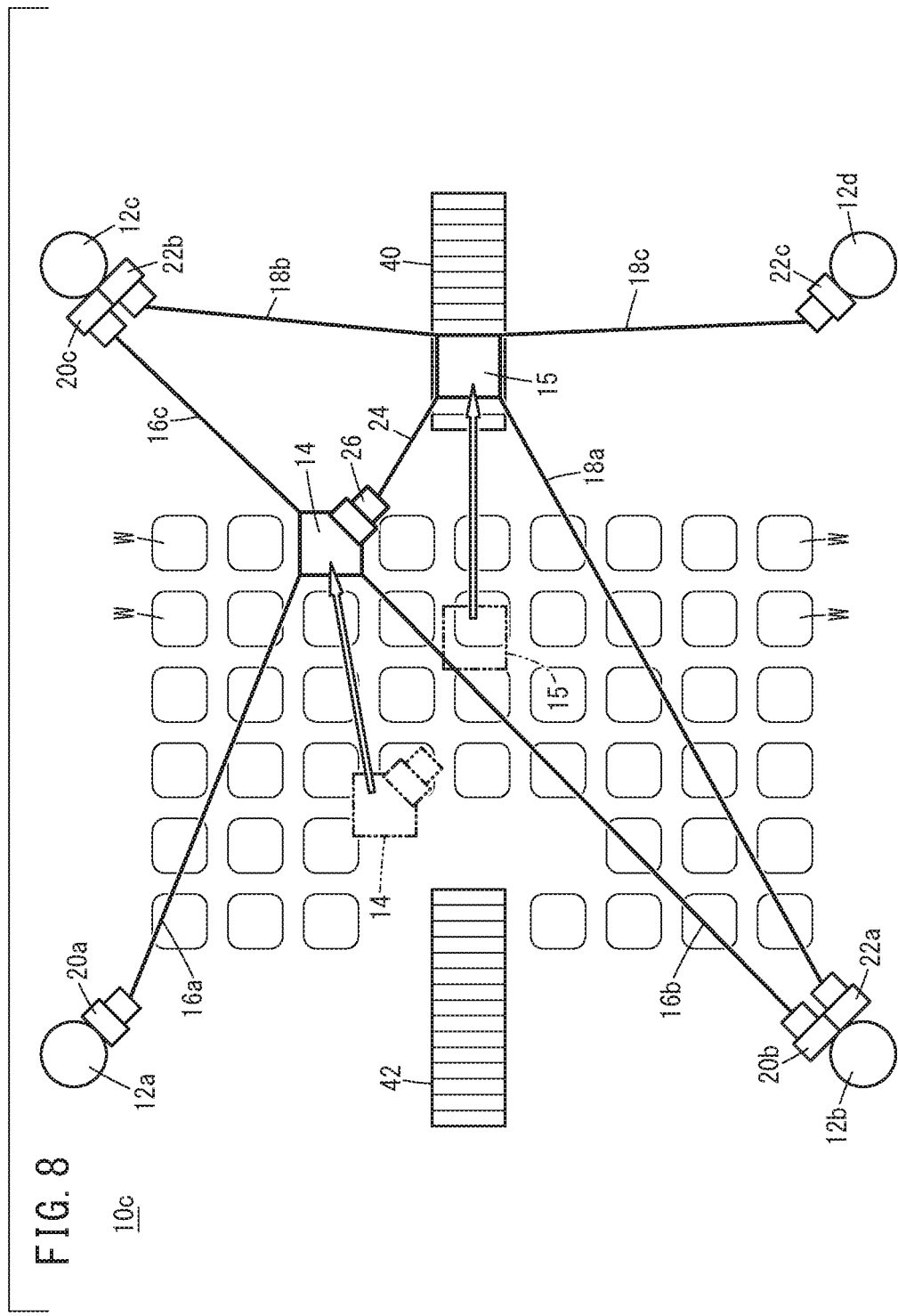
FIG. 8 is a schematic plan view showing a state that the second moving body has been moved to a loading roller conveyor from the position shown in FIG. 7.

After that, as shown in FIG. 8, the second moving body 15 is moved to the loading roller conveyor 40 and holds the object W on the loading roller conveyor 40. At this time, the first moving body 14 in the state of gripping the object W is moved together with the second moving body 15.

Figure 9:
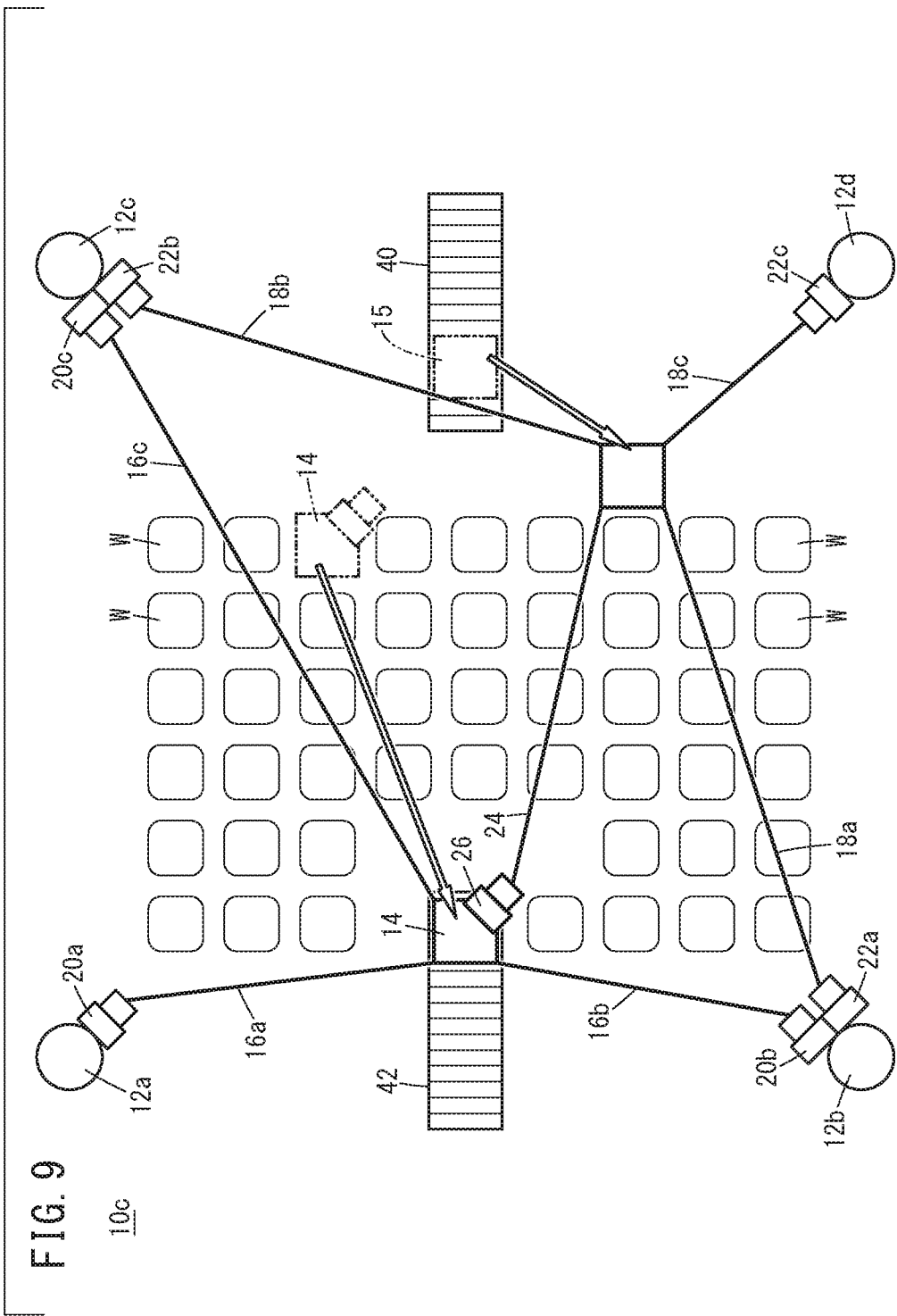
FIG. 9 is a schematic plan view showing another state that the first moving body has been moved to an unloading roller conveyor from the position shown in FIG. 8.

Thereafter, as shown in FIG. 9, the first moving body 14 is moved to the unloading roller conveyor 42 and releases the object W on the unloading roller conveyor 42. At this time, the second moving body 15 in the state of gripping the object W is moved together with the first moving body 14.

Figure 10:
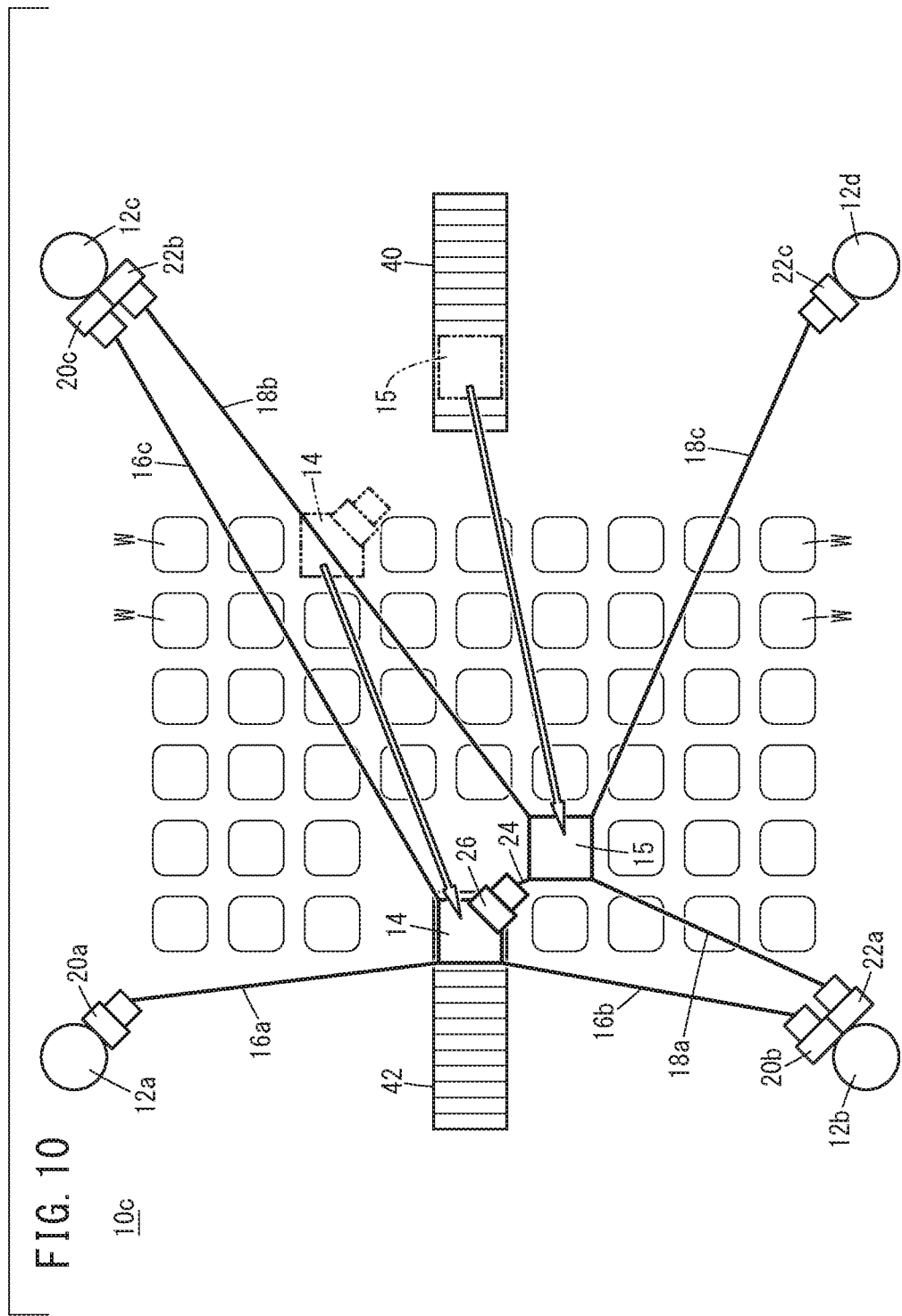
FIG. 10 is a schematic plan view showing still another state that the second moving body has transferred an object to a vacant place, from the position shown in FIG. 9.

Finally, the third wire 24 is wound under the operation of the third motor 26, and as shown in FIG. 10, the second moving body 15 is moved to the vacancy from which the object W has been transferred. Thereafter, the second moving body 15 releases the object W, whereby the new object W is disposed at the vacancy place.

Like this, according to the moving device 10c, it is possible to transfer two objects W individually.

Figure 11:
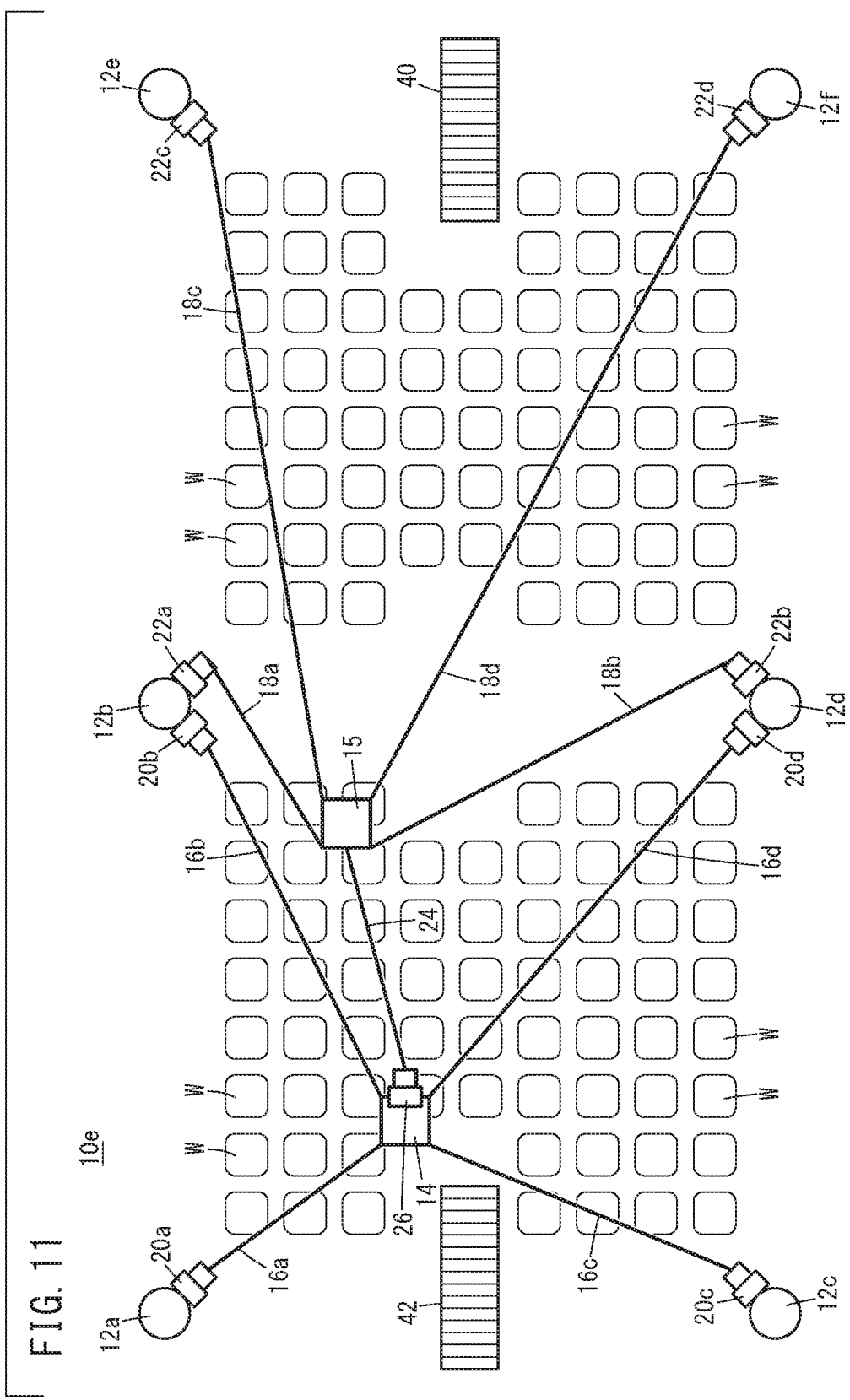
FIG. 11 is a schematic plan view of a moving device according to a third embodiment of the present invention.

FIG. 11 is a schematic plan view of a moving device 10e according to a third embodiment. In this moving device 10e, the first moving body 14 is connected to the first support post 12a, the second support post 12b, the third support post 12c and the fourth support post 12d through four first wires 16a to 16d (first cord-shaped bodies), while the second moving body 15 is connected to the second support post 12b, the fourth support post 12d, a fifth support post 12e and a sixth support post 12f through four second wires 18a to 18d (second cord-shaped bodies).

The four first wires 16a to 16d are fed out (unwound) or taken up (wound) under the operation of first motors 20a to 20d respectively provided on the first support post 12a to the fourth support post 12d. Further, the four second wires 18a to 18d are fed out (unwound) or taken up (wound) under the operation of second motors 22a to 22d respectively provided on the second support post 12b and the fourth support post 12d to the sixth support post 12f. That is, in this case, the first support post 12a to the fourth support post 12d are first feed-out units for feeding out the first wires 16a to 16d, and the second support post 12b, the fourth support post 12d to the sixth support post 12f are second feed-out units for feeding out the second wires 18a to 18d. Therefore, the second support post 12b and the fourth support post 12d serve as both of the first feed-out unit and the second feed-out unit.

The first moving body 14 and the second moving body 15 are connected by the third wire 24 (third cord-shaped body). In this case, the first moving body 14 is provided with the third motor 26, and the third wire 24 is wound around the third motor 26. An end of the third wire 24 is hooked on the second moving body 15. Thus, when the third wire 24 is wound and tensioned, the second moving body 15 is drawn toward the first moving body 14.

Further, the moving device 10e is additionally provided with the loading roller conveyor 40 and the unloading roller conveyor 42. One end of the loading roller conveyor 40 that is adjacent to the second moving body 15 and one end of the unloading roller conveyor 42 that faces the first moving body 14 are located within the overlapping area OV.

Figure 12:
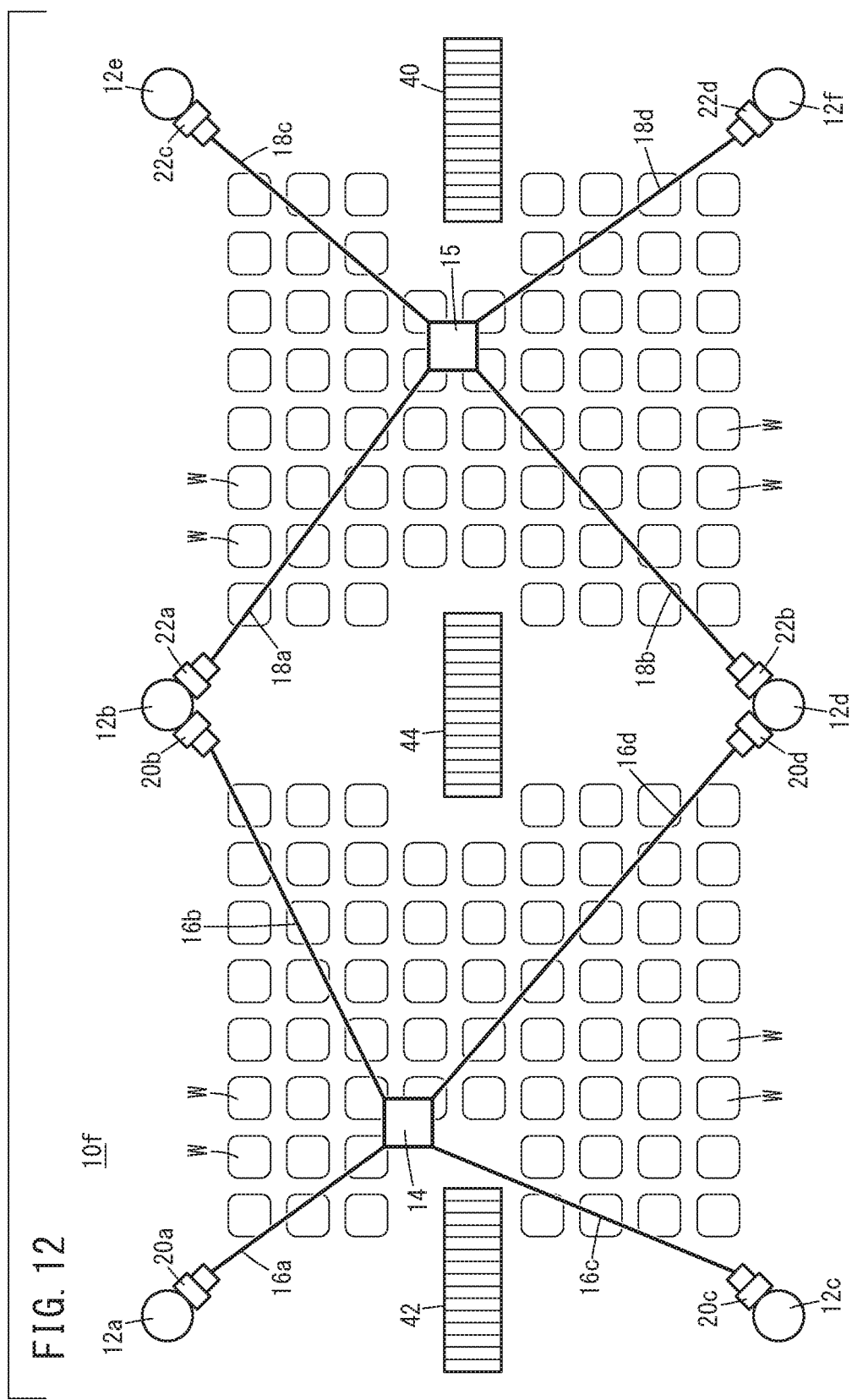
FIG. 12 is a schematic plan view of a moving device which is not provided with a third wire and a third motor in the moving device shown in FIG. 11.

FIG. 12 shows a moving device 10f in which the third wire 24 is not arranged between the first moving body 14 and the second moving body 15. In this moving device 10f, by suitably feeing out and taking up the first wires 16a to 16d, it is possible to move the first moving body 14 only within an area (first moving range A1') surrounded by the first support post 12a to the fourth support post 12d. Further, by suitably feeing out and taking up the second wires 18a to 18d, it is possible to move the second moving body 15 only within an area (second moving range A2') surrounded by the second support post 12b and the fourth support post 12d to the sixth support post 12f. Accordingly, in order to transfer the object W supplied from the loading roller conveyor 40, to the unloading roller conveyor 42, it is necessary to provide an intermediate roller conveyor 44.

Specifically, the object W supplied from the loading roller conveyor 40 is first placed within the second moving range A2' under the operation of the second moving body 15. Then, the second moving body 15 holds the object W again, moves together therewith to one end of the intermediate roller conveyor 44 and releases the object W. Thereafter, the object W is moved to the other end of the intermediate roller conveyor 44 under the operation of the intermediate roller conveyor 44, and then the first moving body 14 holds the object W. The first moving body 14 places the object W within the first moving range A1'. Then the first moving body 14 holds the object W again, moves together therewith to one end of the unloading roller conveyor 42, and releases the object W. In this way, the object W supplied from the loading roller conveyor 40 can be unloaded by the unloading roller conveyor 42 through the intermediate roller conveyor 44.

On the other hand, in the moving device 10e, the third wire 24 is connected between the first moving body 14 and the second moving body 15 (refer to FIG. 11). With this third wire 24 held under tension, movement of the second moving body 15 is restrained by the first moving body 14, and thus when the first moving body 14 is moved, the second moving body 15 is accordingly pulled by the third wire 24 and moved. The movement of the second moving body 15 likewise causes the first moving body 14 to be pulled by the third wire 24 and moved.

Accordingly, it is possible, for example, to move the second moving body 15 to the area surrounded by the first support post 12a to the fourth support post 12d. For this reason, it is possible to hand over the object W between the second moving body 15 and the first moving body 14 without the need to provide the intermediate roller conveyor 44.

That is, according to the moving device 10e, the intermediate roller conveyor 44 is unnecessary. Thus, it is possible to simplify and downsize a transfer system including the moving device 10e.

Figure 13:
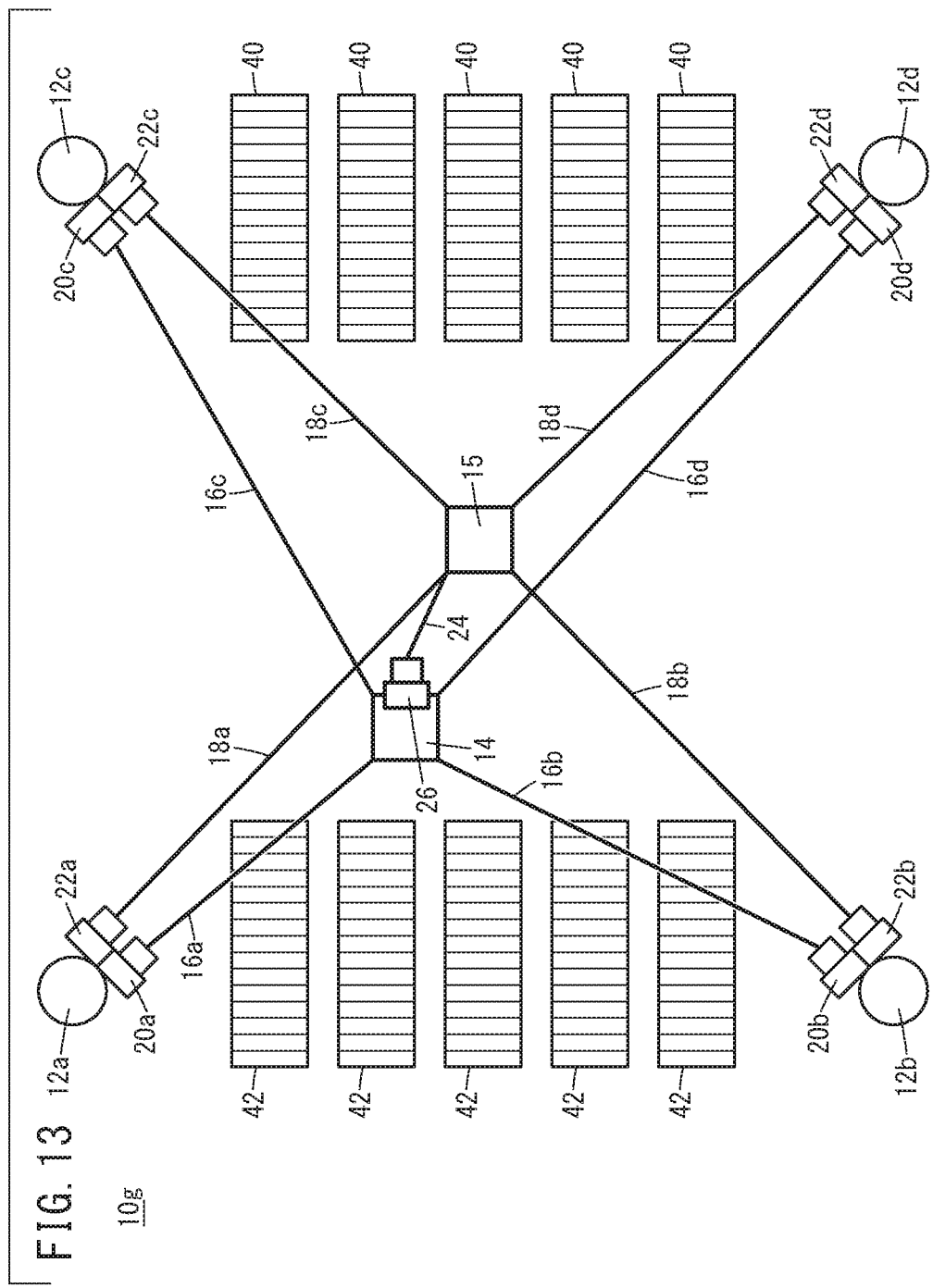
FIG. 13 is a schematic plan view of a moving device according to a fourth embodiment of the present invention.

Although the foregoing moving devices 10a, 10c and 10e are each configured to change the planar arrangement of the objects W (i.e., to move the object W within a two-dimensional plane), it is also possible to change the height position of the object W. A moving device 10g for this purpose is shown as a fourth embodiment in FIGS. 13 and 14. Incidentally, FIG. 13 is a schematic plan view, and FIG. 14 is a schematic side view in which the second support post 12b and the fourth support post 12d are omitted from illustration.

In the moving device 10g according to the fourth embodiment, the first support post 12a to the fourth support post 12d are respectively provided with the first motors 20a to 20d for feeding out or taking up the first wires 16a to 16d, and are also respectively provided with the second motors 22a to 22d for feeding out or taking up the second wires 18a to 18d. That is, the first support post 12a to the fourth support post 12d each serve as both of the first feed-out unit and the second feed-out unit. Incidentally, on each of the support posts 12a to 12d, the first motors 20a to 20d are arranged at lower positions, while the second motors 22a to 22d are arranged at upper positions (refer to FIG. 14).

The four first wires 16a to 16d are connected to the first moving body 14. Thus, by suitably feeding out or taking up the first wires 16a to 16d, it is possible to move the first moving body 14 horizontally and vertically. Similarly, the second moving body 15 is moved horizontally and vertically by suitably feeding out or taking up the second wires 18a to 18d.

Further, the first moving body 14 and the second moving body 15 are connected by the third wire 24. In this case, the first moving body 14 is provided with the third motor 26, and the third wire 24 is wound around the third motor 26. An end of the third wire 24 is hooked on the second moving body 15. Thus, when the third wire 24 is wound and tensioned, the second moving body 15 is drawn toward the first moving body 14.

Further, twenty loading roller conveyors 40, which are configured by five horizontal rows and four vertical columns, are arranged within a space between the third support post 12c and the fourth support post 12d. Further, twenty unloading roller conveyors 42, which are configured by five horizontal rows and four vertical columns, are arranged within a space between the first support post 12a and the second support post 12b.

As described above, in the moving device 10g, the first moving body 14 and the second moving body 15 are moved horizontally and vertically by suitably feeding out and taking up the first wires 16a to 16d and the second wires 18a to 18d. Accordingly, for example, it is possible to transfer the object W on the loading roller conveyor 40 at the lowermost level (first level) not only onto the unloading roller conveyor at the lowermost level (first level) but also onto the unloading roller conveyor 42 at the second level, the third level or the uppermost level (fourth level) higher than the lowermost level. Likewise, for example, it is also possible to transfer the object W on the loading roller conveyor 40 closest to the fourth support post 12d not only onto the unloading roller conveyor 42 closest to the second support post 12b but also onto the unlading roller conveyor 42 which is closer to the first support post 12a.

Accordingly, for example, in a case where different types of objects W are randomly supplied onto the twenty loading roller conveyors 40, it is possible to sort the objects W by type and unload the sorted objects W from the unloading roller conveyors 42.

The present invention is not particularly limited to the foregoing first to fourth embodiments, and may be variously altered without departing from the scope of the present invention.

For example, the moving devices 10a, 10c, 10e, 10g are not limited particularly to a device for transferring the objects W. That is, the first moving body 14 and the second moving body 15 are not necessarily required to be provided with the gripping mechanisms. As one example of such a moving device, there is exemplified a photographing device having cameras attached respectively to the first moving body 14 and the second moving body 15.

Further, the cord-shaped body may be a rope, a chain or the like.

Furthermore, the third motor 26 may be provided on the second moving body 15, and the end of the third wire 24 may be hooked on the first moving body 14.

What is claimed is:

1. A moving device comprising:
a first moving body;
at least two first feed-out units;
at least two first cord-shaped bodies stretched between the first moving body and the first feed-out units;
first feed-out length changing units configured to change feed-out lengths of the first cord-shaped bodies individually;
a second moving body at least two second feed-out units;
at least two second cord-shaped bodies stretched between the second moving body and the second feed-out units;
second feed-out length changing units configured to change feed-out lengths of the second cord-shaped bodies individually, and
a third feed-out length changing unit provided for either the first moving body or the second moving body in an integral manner,
wherein the third feed-out length changing unit changes a feed-out length of a third cord-shaped body stretched between the third feed-out length changing unit and the other of the first moving body or the second moving body, and
the third feed-out length changing unit moves when the first moving body or the second moving body that is provided with the third feed-out length changing unit moves.

2. The moving device according to claim 1, wherein:
only in a state that the third cord-shaped body is tensioned, a moving range of the first moving body and a moving range of the second moving body partially overlap with each other.

3. The moving device according to claim 2, wherein:
number of the first cord-shaped bodies is three or more, and number of the second cord-shaped bodies is three or more.

4. The moving device according to claim 1, wherein:
the first moving body and the second moving body are each provided with a gripping mechanism.

5. The moving device according to claim 1, wherein:
the first moving body and the second moving body are each configured to be moved horizontally and vertically.

* * * * *